United States Patent
Onodera et al.

(10) Patent No.: US 12,400,045 B2
(45) Date of Patent: Aug. 26, 2025

(54) SUPPORT DEVICE AND SEARCH KEY SHAPE REGISTRATION METHOD

(71) Applicant: Hitachi, Ltd., Tokyo (JP)

(72) Inventors: Makoto Onodera, Tokyo (JP); Yuki Itabayashi, Tokyo (JP); Masayuki Hariya, Tokyo (JP); Chikara Kongou, Tokyo (JP); Masaki Shintani, Tokyo (JP); Hiroki Kawamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1059 days.

(21) Appl. No.: 17/231,193

(22) Filed: Apr. 15, 2021

(65) Prior Publication Data

US 2021/0334421 A1     Oct. 28, 2021

(30) Foreign Application Priority Data

Apr. 24, 2020 (JP) ................. 2020-077247

(51) Int. Cl.
 *G06F 30/12* (2020.01)
 *G06F 111/02* (2020.01)
 *G06F 111/20* (2020.01)

(52) U.S. Cl.
 CPC .......... *G06F 30/12* (2020.01); *G06F 2111/02* (2020.01); *G06F 2111/20* (2020.01)

(58) Field of Classification Search
 CPC ................................................ G06F 2111/20
 See application file for complete search history.

(56) References Cited

U.S. PATENT DOCUMENTS

2022/0129598 A1 * 4/2022 Hong ................. G06F 30/23

FOREIGN PATENT DOCUMENTS

| EP | 3229155 A1 * | 10/2017 | ............. G06F 17/50 |
| JP | 2004145555 A * | 5/2004 | ........... G06K 9/6217 |
| JP | 2007-102282 A | 4/2007 | |

OTHER PUBLICATIONS

Funkhouser et al. A Search Engined for 3D Models ACM Transactions on Graphics, vol. 22, No. 1, Jan. 2003, pp. 83-105 (Year: 2003).*

Furuhashi Yukito et al. Data Base Registration System and Data Base Registration Method JP 2004145555 (Year: 2004).*

(Continued)

*Primary Examiner* — Rehana Perveen
*Assistant Examiner* — Cuong V Luu
(74) *Attorney, Agent, or Firm* — MATTINGLY & MALUR, PC

(57) ABSTRACT

Generation of a search key shape for identifying a dedicated shape with respect to three-dimensional CAD data is facilitated. A shape group registration unit registers multiple pieces of three-dimensional CAD data; a feature amount computation unit computes a feature amount with respect to each of the registered pieces of three-dimensional CAD data; a clustering unit clusters the pieces of three-dimensional CAD data based on a feature amount; a cluster center computation unit determines a feature amount of a cluster center of each cluster from a feature amount of three-dimensional CAD data; and a search key shape registration unit registers feature amount data of a cluster center as feature amount data of a search key shape.

9 Claims, 13 Drawing Sheets

(56) References Cited

OTHER PUBLICATIONS

Toby David An Automated Method Mapping Parametric Features Between Comuter Aided Design Software Brunel University, Department Of Computer Science, Doctoral Thesis, 2019 (Year: 2019).*

Masayuki Hariya, et al., Technique for Checking Design Rules for Three-Dimensional CAD Data, Proc. IEEE Conf. Computer Science and Information Technology (ICCSIT), 2010, pp. 296-300.

Makoto Onodera, et al., "Development of Insight CAD system that automatically verifies various design rules on 3D CAD", the Japan Society of Mechanical Engineering, the 29th Design Engineering and System Department lecture Meeting 2019.

Makoto Onodera, et al., "Development of mesh generation technique reusing proven analysis models by similar sub-part search", The Society of Mechanical Engineering Proceedings, vol. 83, No. 853, 2017, [DOI:10.1299/transjsme.17-00073].

Makoto Onodera, et al., "Shell mesh generation technique reusing proven models by similar sub-part search", Journal of Advanced Mechanical Design, Systems, and Manufacturing vol. 13, No. 4, 2019.

* cited by examiner

402

| ID | AREA | PERIMETER | MINIMUM CURVATURE | MAXIMUM CURVATURE |
|---|---|---|---|---|
| 401a | 12.76 | 16.25 | 0.0 | 0.0 |
| 401b | 63.27 | 33.09 | 0.0 | 0.25 |
| 401c | 12.76 | 16.25 | 0.0 | 0.0 |
| 401d | 12.0 | 16.0 | 0.0 | 0.0 |
| 401e | 12.76 | 16.25 | 0.0 | 0.0 |
| 401f | 63.27 | 33.09 | 0.0 | 0.25 |
| 401g | 12.76 | 16.25 | 0.0 | 0.0 |
| 401h | 12.0 | 16.0 | 0.0 | 0.0 |
| 401i | 30.16 | 52.45 | 0.0 | 0.0 |
| 401j | 22.21 | 31.42 | 0.0 | 0.5 |
| 401k | 62.83 | 25.13 | 0.0 | 0.5 |

| | 401a | 401b | 401c | 401d | 401e | 401f | 401g | 401h | 401i | 401j | 401k |
|---|---|---|---|---|---|---|---|---|---|---|---|
| 401a | 1 | 1 | 0 | 0 | 0 | 0 | 0 | 1 | 1 | 0 | 0 |
| 401b | 1 | 1 | 1 | 0 | 0 | 0 | 0 | 0 | 1 | 0 | 0 |
| 401c | 0 | 1 | 1 | 1 | 0 | 0 | 0 | 0 | 1 | 0 | 0 |
| 401d | 0 | 0 | 1 | 1 | 1 | 0 | 0 | 0 | 1 | 0 | 0 |
| 401e | 0 | 0 | 0 | 1 | 1 | 1 | 0 | 0 | 1 | 0 | 0 |
| 401f | 0 | 0 | 0 | 0 | 1 | 1 | 1 | 0 | 1 | 0 | 0 |
| 401g | 0 | 0 | 0 | 0 | 0 | 1 | 1 | 1 | 1 | 0 | 0 |
| 401h | 1 | 0 | 0 | 0 | 0 | 0 | 1 | 1 | 1 | 0 | 0 |
| 401i | 1 | 1 | 1 | 1 | 1 | 1 | 1 | 1 | 1 | 1 | 0 |
| 401j | 0 | 0 | 0 | 0 | 0 | 0 | 0 | 0 | 1 | 1 | 1 |
| 401k | 0 | 0 | 0 | 0 | 0 | 0 | 0 | 0 | 0 | 1 | 1 |

SUPPORT DEVICE AND SEARCH KEY SHAPE REGISTRATION METHOD

CROSS-REFERENCE TO RELATED APPLICATION

This application claims priority to Japanese Patent Application No. 2020-077247 filed on Apr. 24, 2020, the entire contents of which are incorporated by reference herein.

BACKGROUND

The present invention relates to a design support device and a search key shape registration method for extracting and registering a search key shape for extracting a desired partial shape from three-dimensional CAD data.

Three-dimensional CAD (Computer Aided Design) is in wide use as a design tool in the field of product designing. The three-dimensional CAD is a tool generating a product shape on a computer and allows a shape to be freely defined in accordance with a designer's intention. However, in product designing, a shape satisfying multiple requirements must be defined by trial and error with manufacturing requirements pertaining to machine tools and production engineering and designing requirements, such as strength, temperature, and safety, taken into account. Such a requirement a designer should obey is designated here as a "design rule."

In cases where a designer is lacking in experience or cases where in a design process, a large number of design rules must be taken into account within a limited design period, an omission is prone to occur in checking of design rules. As a result, redesigning may be required causing a process delay or recalling may occur because of any defect detected after product shipping. Or, a possibility of performance enhancement or cost reduction may be overlooked and an opportunity loss may result.

Consequently, the following prior arts are present to prevent an omission in checking of design rules in product designing: Japanese Unexamined Patent Application Publication No. 2007-102282 discloses a device. In the device, restrictions of allowable size in terms of manufacture, restrictions of allowable disposition distance between feature shapes in terms of manufacture, and restrictions of allowable disposition distance between a feature shape and a model contour end portion or a bend section in terms of manufacture are compared with a user generated feature shape. When the user generated shape does not conform to any restriction in terms of manufacture, the point in question is discriminately displayed on a display device. Further, a group of improvement plans is presented with respect to correction of size or disposition distance. Then, the shape in question can be altered (modified) by changing a size or a disposition distance or adding a new shape in accordance with an improvement plan selected from the group of improvement plans by the user. "Technique for Checking Design Rules for Three-Dimensional CAD Data" (HARIYA, M. et al., Proc. IEEE Conf. Computer Science and Information Technology (ICCSIT), pp. 296-300, 2010) and "Development of Discovery Support CAD System Capable of Automatically Verifying a Wide Variety of Design Rules on Three-Dimensional CAD" (Onodera, M. et al., the Japan Society of Mechanical Engineering, the 29th Design Engineering and System Department lecture Meeting 2019) disclose a device that clarifies a check procedure for design rules, develops a check program (software) for each design rule, and displays a design rule breaching portion on a three-dimensional CAD. As a result, design requirements can be checked when a three-dimensional CAD model is generated and an occurrence of a problem at subsequent steps is reduced.

SUMMARY

However, in the technologies described in Japanese Unexamined Patent Application Publication No. 2007-102282, "Technique for Checking Design Rules for Three-Dimensional CAD Data," and "Development of Discovery Support CAD System Capable of Automatically Verifying a Wide Variety of Design Rules on Three-Dimensional CAD," shapes extracted from three-dimensional CAD data for checking design rules are limited to the following shapes:

(1) Shapes corresponding to a feature, such as a hole and fillet, of three-dimensional CAD,
(2) Shapes identified by a geometrical feature, such as a contact face between parts and faces connected by tangential succession, and
(3) Shapes identified by attribute information, such as a part number (part type) or a welding position, other than a shape Meanwhile, in the case of such a design rule as a size or a position with respect to a receiving structure for securing a part, a reinforcing structure based on know-how, such a dedicated shape that collectively performs a function to some extent must be extracted. In this case, in the methods described in "Technique for Checking Design Rules for Three-Dimensional CAD Data" and "Development of Discovery Support CAD System Capable of Automatically Verifying a Wide Variety of Design Rules on Three-Dimensional CAD," a program for identifying a target shape must be separately developed and installed. Further, each time a new dedicated shape is designed, the program must be revised and permanent maintenance is required.

On the other hand, the above-mentioned dedicated shapes have a wide range of variations but include a large number of structural commonalities and often have a relatively similar shape. For this reason, use of such a similar shape search technology as shown in "Development of Analytical Model Reuse Type Mesh Automatic Generation Technology Using Similar Part Shape Search" (Onodera, M. et al, The Society of Mechanical Engineering Proceedings, Vol. 83, No. 853, 2017 [DOI:10.1299/transjsme.17-00073]) to identify a shape is probably effective. However, to use a similar shape search technology, a shape to be a search key (hereafter, referred to as "search key shape") must be prepared. For this reason, when dedicated shapes are multifaceted, a recognition rate with which a search key shape is recognized from three-dimensional CAD data varies depending on how this search key shape is to be defined. When a recognition rate of 100% or an accuracy equivalent to the recognition rate is required, the task of defining a search key shape is difficult and requires trial and error.

A search key shape is defined by such a feature amount as area, perimeter, curvature, and relation of face connection. For example, when a dedicated shape desired to search for is a shape of a boss structure receiving a screw or a bolt, the structure is multifaceted. Specifically, the height or diameter of a boss varies depending on a type or a mounting position of a screw or a bolt, and a rib may be attached to the circumference for stiffening or a fillet may be not provided at a midpoint of a designing process. Performing classification according to the height or diameter of a boss, a number or a size of stiffening ribs, presence/absence of a fillet, or the like and defining a search key shape such that a failure to search for any pattern and excessive searching are prevented is a hard task involving trial and error. Under present circumstances, such a task of defining a search key shape is a sophisticated task dependent on a worker's skill or experience.

The present invention has been made in view of the above-mentioned circumstances and aims to efficiently generate a search key shape used to identify a dedicated shape.

To solve the above-mentioned problem, for example, a configuration described in What is claimed is: is adopted.

A design support device registering a search key shape for performing a similar shape search with respect to a predetermined partial shape according to an embodiment of the present invention includes a processor, a memory, and a search key shape registration program loaded to the memory and executed by the processor. The search key shape registration program includes a shape group registration unit, a feature amount computation unit, a clustering unit, a cluster center computation unit, and a search key shape registration unit. The shape group registration unit registers multiple pieces of three-dimensional CAD data; the feature amount computation unit computes a feature amount with respect to each of the registered pieces of three-dimensional CAD data; the clustering unit clusters the multiple pieces of three-dimensional CAD data based on a feature amount; the cluster center computation unit determines a feature amount of a cluster center from a feature amount of three-dimensional CAD data for each cluster; and the search key shape registration unit registers feature amount data of a cluster center as a feature amount data of a search key shape.

Since a search key shape for identifying a dedicated shape can be easily generated, a coverage of design rule check can be expanded.

Other problems and novel features will be apparent from the description in the present specification and accompanying drawings.

BRIEF DESCRIPTION OF THE DRAWINGS

FIG. 6C illustrates an example of feature amount data of the shape shown in FIG. 6A;

DETAILED DESCRIPTION

Hereafter, a description will be given to an example of a design support device according to the present invention with reference to the drawings.

Figure 1:
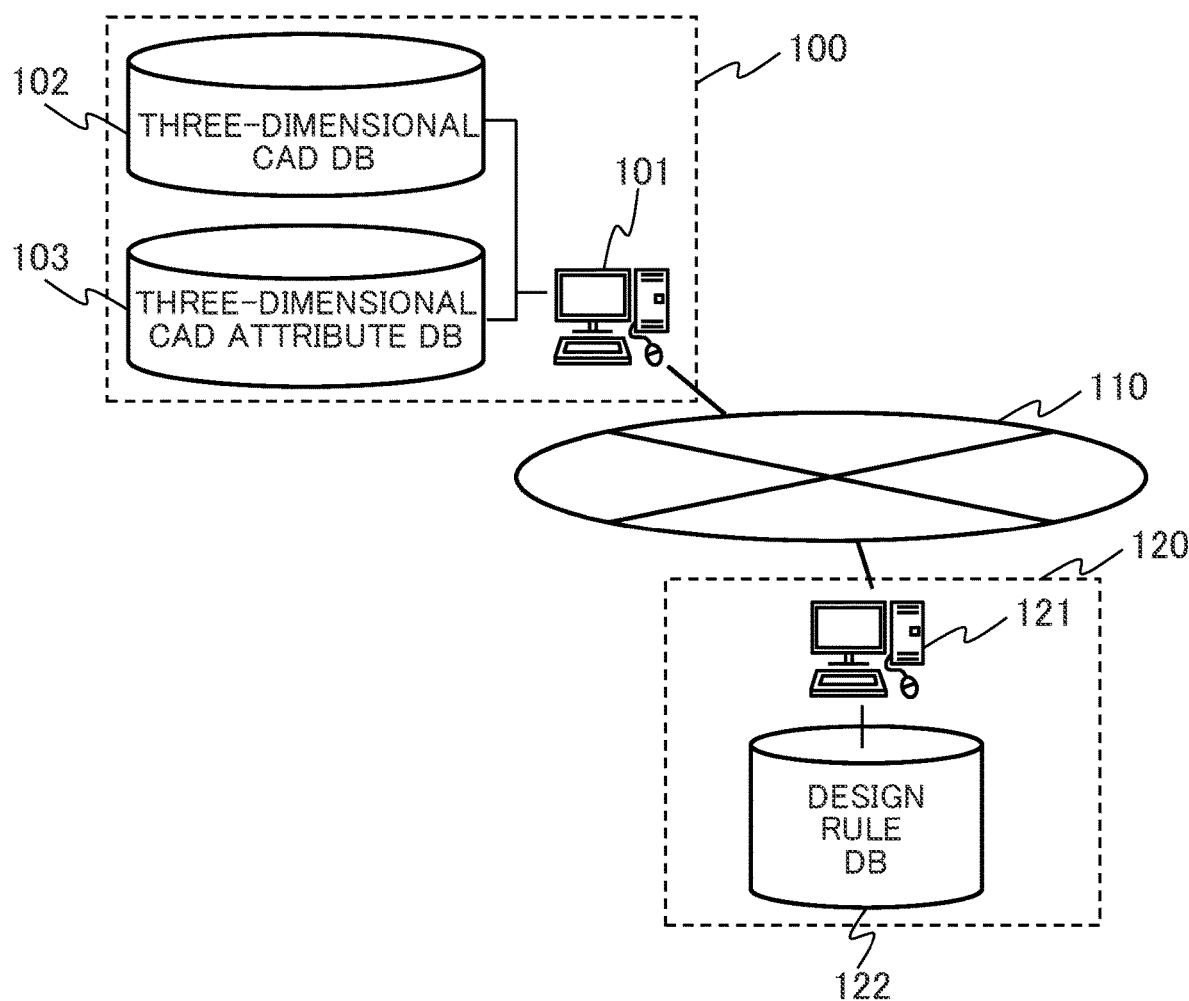
FIG. 1 illustrates an example of a designing environment in which a design support device is used.

FIG. 1 shows an example of a designing environment in which a design support device according to an embodiment of the present invention is used. A design system 100 includes a design device 101 designing a three-dimensional shape of a part or a member using three-dimensional CAD. A three-dimensional CAD database 102 stores three-dimensional CAD data that is shape information (three-dimensional model) of a designed object designed by the design device 101. A three-dimensional CAD attribute database 103 stores a name and attribute information of a designed object. The three-dimensional CAD data stored in the three-dimensional CAD database 102 includes shape information representing a designed object by face, line, and point. The three-dimensional CAD attribute database 103 stores attribute information, other than shape information, in association with three-dimensional CAD data.

A design support system 120 includes a design support device 121 that extracts a predetermined dedicated shape from three-dimensional CAD data designed at the design device 101 by a similar shape search using a search key shape. A design rule database 122 stores a design rule to which is a design department or a designer is required to adhere with respect to a designed object. A design rule may be prescribed on a designed object-by-designed object basis or may be prescribed in common to a large number of designed objects. In this example, design rules are databased as an electronic file. However, some design rules are held in a paper medium or as know-how and any medium for holding design rules is acceptable. The design support device 121 is further provided with a function of defining a search key shape for searching three-dimensional CAD data for a dedicated shape targeted by such a design rule.

The design system 100 and the design support system 120 are preferably connected with each other via a network 110.

Figure 2:
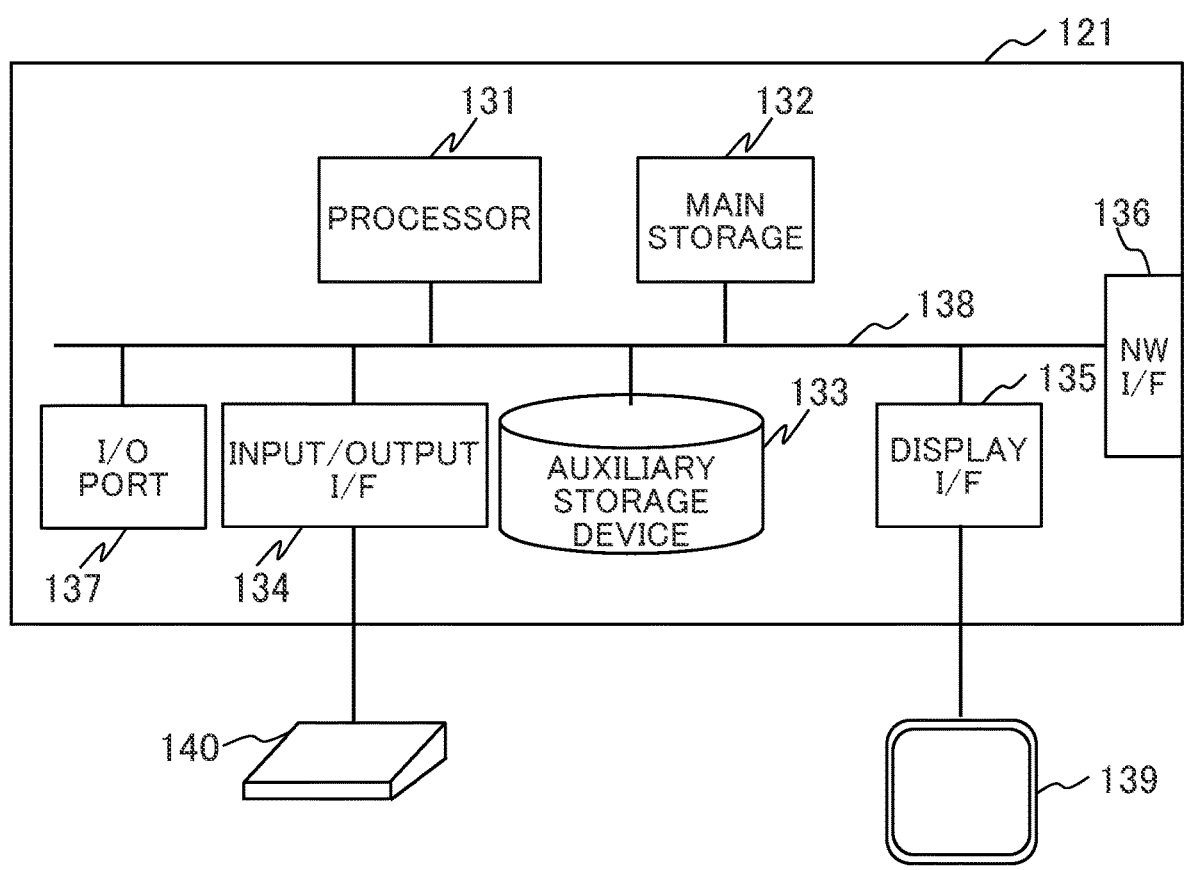
FIG. 2 illustrates an example of a hardware configuration of a design support device.

FIG. 2 shows an example of a hardware configuration of the design support device 121. The design support device 121 includes a processor 131, a main storage 132, an auxiliary storage device 133, an input/output interface 134, a display interface 135, a network interface 136, and an input/output (I/O) port 137 and these items are coupled with one another via a bus 138. The input/output interface 134 is connected with such an input device 140 as a keyboard or a mouse and the display interface 135 is connected to a display 139 and implements GUI (Graphical User Interface). The network interface 136 is an interface for connection with the network 110. The auxiliary storage device 133 is usually constructed of HDD (Hard Disk Drive), ROM (Read Only Memory), or such a nonvolatile memory as a flash memory and stores a program executed by the design support device 121, data processed by a program, and the like. The main storage 132 is constructed of RAM (Random Access Memory) and temporarily stores a program, data required for execution of a program, and the like in accordance with an instruction from the processor 131. The processor 131 executes a program loaded from the auxiliary storage device 133 to the main storage 132. The design support device 121 can be implemented, for example, by PC (Personal Computer) or a server.

Figure 3:
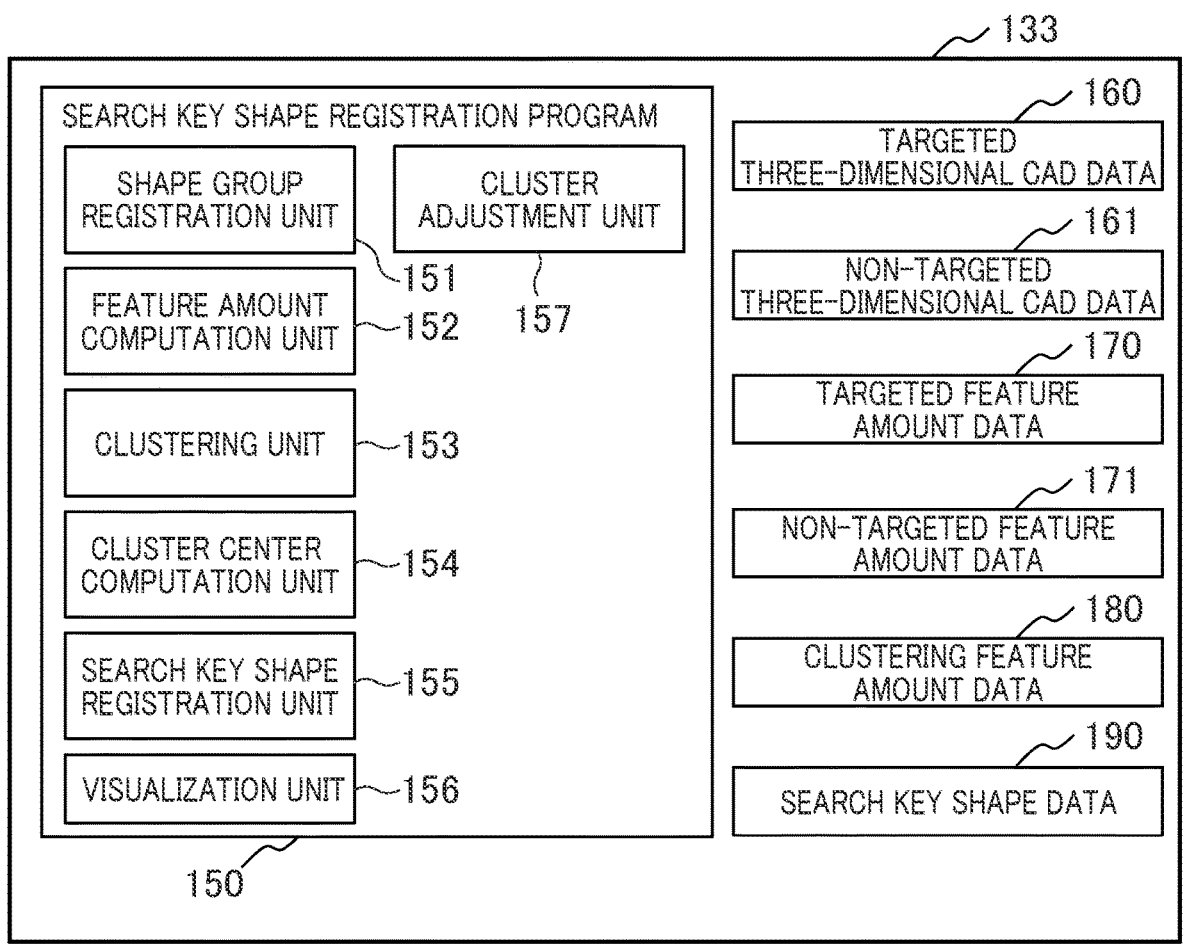
FIG. 3 illustrates an example of a program and data stored in an auxiliary storage device.

As shown in FIG. 3, a search key shape registration program 150 is registered in the auxiliary storage device 133. In the auxiliary storage device 133, a program stored in various media may be stored via an optical drive or an external HDD connected to the I/O port 137 or a program delivered via the network 110 may be stored. The auxiliary storage device 133 also stores data used or generated by the search key shape registration program 150. The contents of programs and these pieces of data will be described later. In the present embodiment, the functions of the design support device 121 are implemented by a program stored in the auxiliary storage device 133 being executed by the processor 131 and predetermined processing being performed in cooperation with other hardware. A program executed by a computer or the like, a function of the program, and a means that implements the function will be designated as "function," "unit," "module," or the like in some cases.

First Embodiment

Hereafter, a description will be given to processing performed by the search key shape registration program 150 in the first embodiment.

(1) Shape Group Registration Unit 151

In the first embodiment, a set of partial shapes (three-dimensional CAD data) desired to search for as a similar shape is registered as targeted three-dimensional CAD data 160 (Refer to FIG. 3). Registration methods include a method of registering a CAD data file obtained by extracting only a partial shape and a method of specifying a face constituting a partial shape on a CAD screen.

Figure 4A:
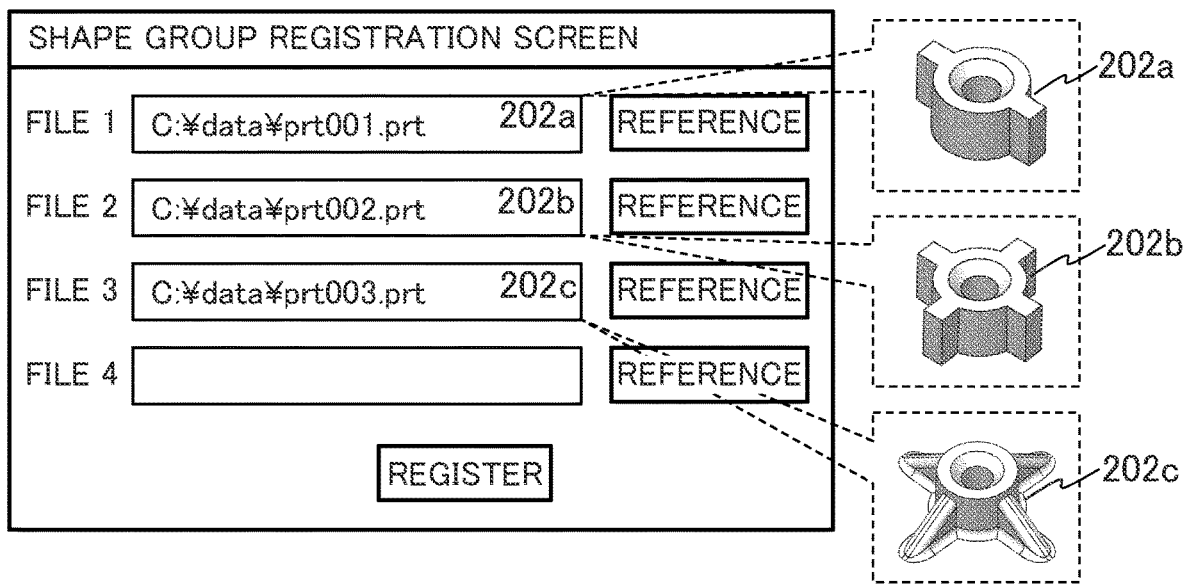
FIG. 4A illustrates an example of a shape group registration screen.

In the case of the former, multiple CAD data files obtained by extracting only a partial shape are registered, for example, from the registration screen 201 shown in FIG. 4A. The CAD data files registered here are CAD data files obtained by registering only partial shapes desired to search for as a similar shape as shown as shapes 202a to 202c.

Figure 4B:
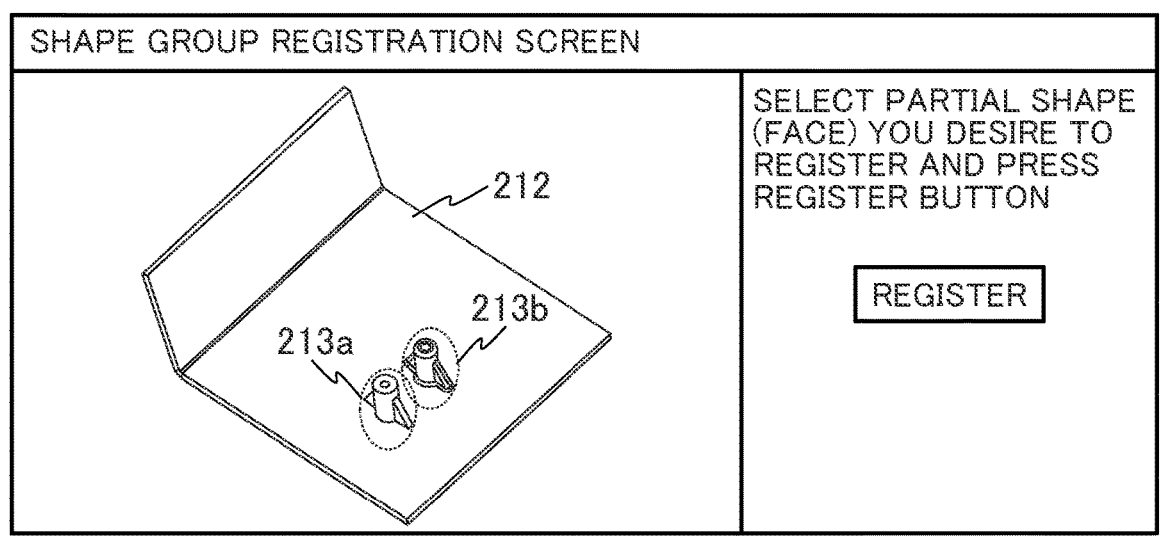
FIG. 4B illustrates an example of a shape group registration screen.

In the case of the latter, a face constituting a partial shape is specified on a CAD screen 212, for example, from the registration screen 211 shown in FIG. 4B. Registration is performed by selecting a face constituting a partial shape with such a pointing device as a mouse. For example, three-dimensional CAD data corresponding to two partial shapes is registered by selecting face 213a and pressing a REGISTER button and selecting face 213b and pressing the REGISTER button.

(2) Feature Amount Computation Unit 152

With respect to targeted three-dimensional CAD data 160 registered at the shape group registration unit 151, a feature amount of the data is computed. In the first embodiment, a shape registered by the shape group registration unit 151 is a partial shape desired to search for as a similar shape; therefore, a computed feature amount is registered as targeted feature amount data 170. For the feature amount, a feature amount used in a similar partial shape search technology disclosed in "Development of Analytical Model Reuse Type Mesh Automatic Generation Technology Using Similar Shape Search" can be used. With respect to this technology, an area, a perimeter, a type, a curvature, and a length in a principal direction of a face are disclosed as a geometric feature amount and a relation of face connection of faces is disclosed as a topological feature amount. Aside from the above elements, an adjacent angle between adjoining faces, an adjacent edge length, and the like can be utilized as a topological feature amount. Feature amounts to be computed are predetermined and a predetermined feature amount is computed with respect to each piece of targeted three-dimensional CAD data 160 and registered as targeted feature amount data 170.

(3) Clustering Unit 153

Targeted feature amount data 170 is clustered according to a feature amount and is registered as clustering feature amount data 180. A clustering technique is not specially limited. A K-means method, a shortest distance method, a multidimensional scaling method, Ward's method, or the like may be adopted. In any clustering technique, similarity (distance) between individuals (feature amount data) must be computed. For the similarity, it is advisable to use similarity described in "Development of Analytical Model Reuse Type Mesh Automatic Generation Technology Using Similar Shape Search." However, the present invention is not limited to this and any method may be used as long as similarity of a shape can be computed.

(4) Cluster Center Computation Unit 154

With respect to clustering feature amount data 180, a feature amount of a cluster center of each cluster is computed. A technique for computing a cluster center is disclosed in relation to various clustering techniques and one of such computation techniques is used. For the sake of convenience, wording of "cluster center" is used but a cluster center need not be strictly a center of a cluster. For example, of pieces of feature amount data included in some cluster, feature amount data closest to a feature amount computed as a center of a cluster may be handled as a cluster center.

(5) Search Key Shape Registration Unit 155

A feature amount of a cluster center computed by the cluster center computation unit 154 is registered as search key shape data 190. The feature amount of a cluster center includes the same contents as those of targeted feature amount data 170. Therefore, a feature amount of a cluster center can be handled as search key shape data.

(6) Visualization Unit 156

Search key shape data 190 or clustering feature amount data 180 is caused to be displayed on the display 139. For example, a CAD shape based on a feature amount registered as search key shape data 190 as a result of clustering is displayed or a CAD shape based on a feature amount of three-dimensional CAD data placed in an identical cluster is displayed.

Subsequently, a description will be given to a processing procedure for search key shape registration in the first embodiment with reference to FIG. 5 to FIG. 8. In the present example, a search key shape pertaining to a boss shape is generated.

Figure 5:
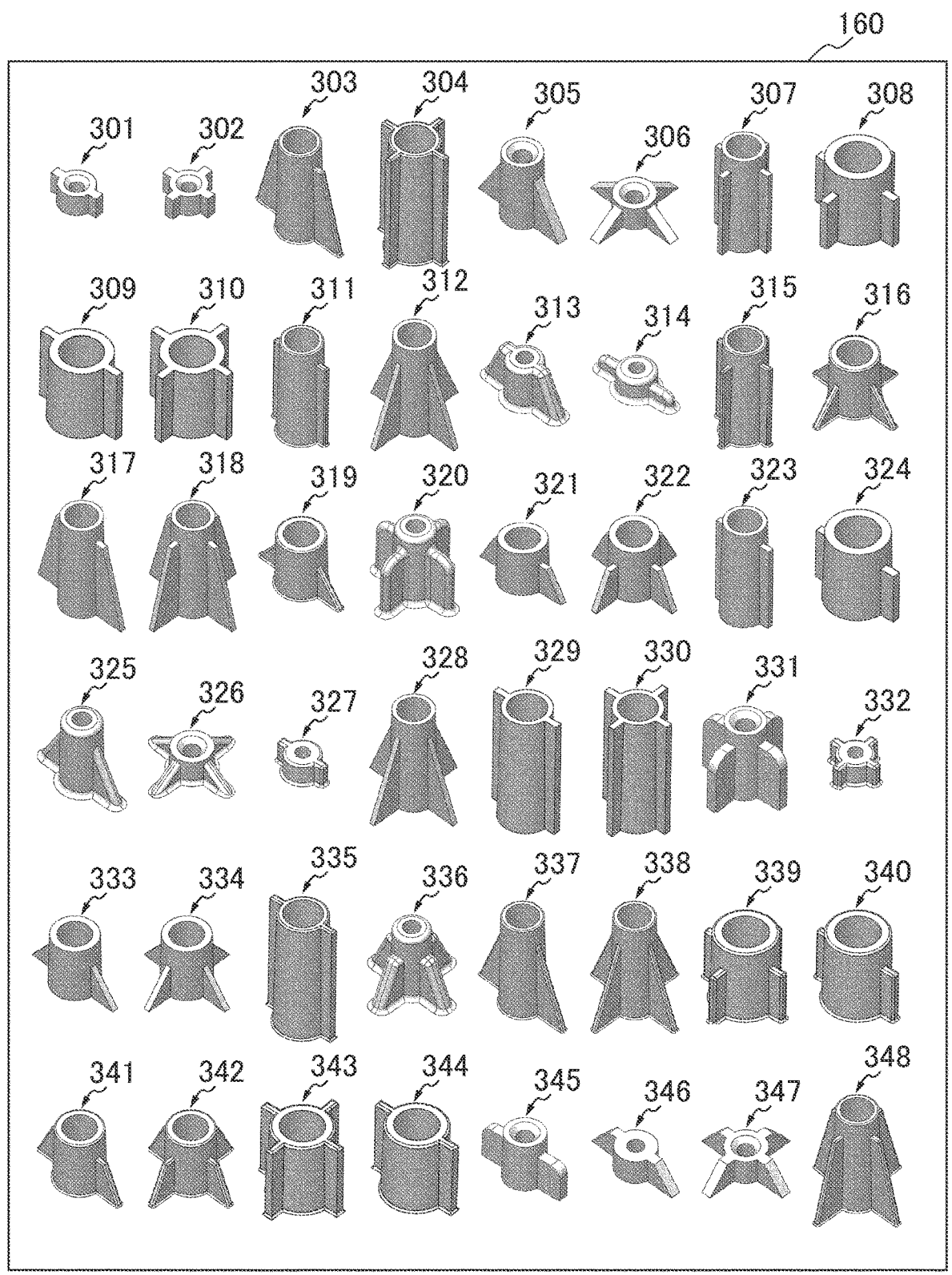
FIG. 5 illustrates an example of a searched shape group.

First, it is assumed that the 48 pieces of three-dimensional CAD data (partial shapes) shown in FIG. 5 are registered as targeted three-dimensional CAD data 160 desired to search for as a similar shape by the shape group registration unit 151. In this drawing, three-dimensional CAD data is presented by a shape for making it easier to understand.

Figures 6A, 6B:
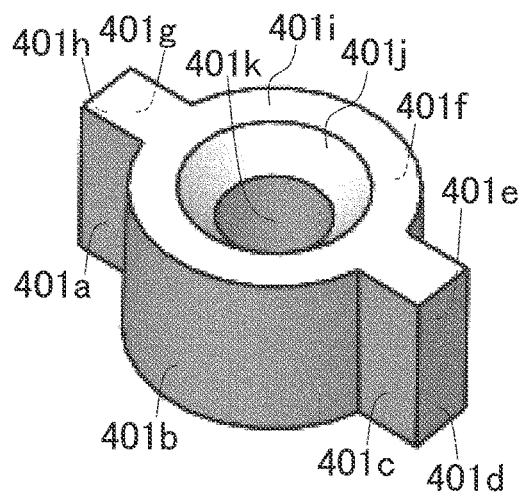
FIG. 6A illustrates an example of a CAD shape.
FIG. 6B is an example of feature amount data of the shape shown in FIG. 6A.

Subsequently, the feature amount computation unit 152 generates targeted feature amount data 170 with respect to each piece of targeted three-dimensional CAD data 160. A description will be given to targeted feature amount data computed, for example, with respect to three-dimensional CAD data of shape 301 shown in FIG. 5 with respect to FIG. 6A to FIG. 6C. As shown in FIG. 6A, shape 301 is a shape constituted of 11 faces, faces 401a to 401k. The present example adopts area, perimeter, minimum curvature, and maximum curvature as a geometric feature amount and a relation of face connection of faces as a topological feature amount based on the method disclosed in "Development of Analytical Model Reuse Type Mesh Automatic Generation Technology Using Similar Shape Search." The table 402 shown in FIG. 6B indicates geometric feature amounts and the area, perimeter, minimum curvature, and maximum curvature of each face of shape 301 shown in FIG. 6A are registered. The table 403 shown in FIG. 6C indicates topological feature amounts and "1" is registered for a set of adjacent faces and "0" is registered for a set of non-adjacent faces with respect to shape 301 shown in FIG. 6A. Such an index representing a feature of a shape is generated as feature amount data.

In the present example, feature amount data is computed with respect to a CAD shape. The CAD shape has data designated as B-REP (Boundary Representation) of faces constituting a solid, boundary lines constituting a face, starting and end points constituting a line, and the like; therefore, geometric data of a face or a boundary line and data of a relation of connection of faces and boundary lines are taken as a feature amount. On the other hand, a representing method for a three-dimensional shape is not limited to boundary representation and such methods as polyhedron representation and point group representation are also available. In the case of polyhedron representation or point group representation, a histogram of inner product values in the direction of the normal to each face, a histogram of point-to-point distances, a number of points within a region, or the like may be taken as a feature amount in computation.

Figure 7:
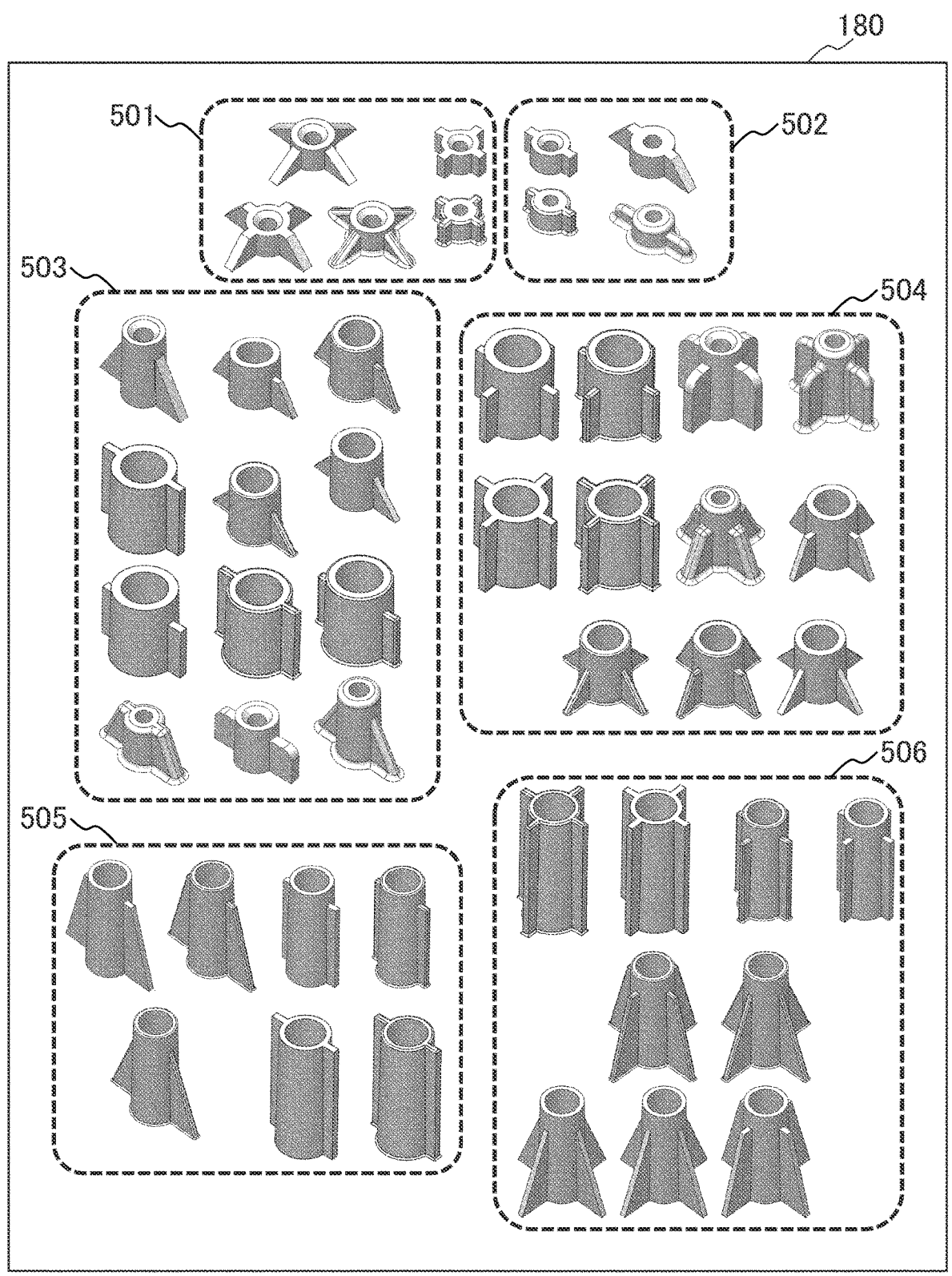
FIG. 7 illustrates an example of clustering feature amount data (CAD shape)

Subsequently, the clustering unit 153 clusters targeted feature amount data 170 according to a feature amount and registers a result of clustering as clustering feature amount data 180. By clustering targeted feature amount data 170 generated with respect to the 48 CAD shapes shown in FIG. 5, the data is divided, for example, into clusters 501 to 506 shown in FIG. 7. Then, a feature amount of three-dimensional CAD data constituting each cluster is registered as clustering feature amount data 180 of each cluster. The result of clustering shown in FIG. 7 is an example and a different clustering result may be obtained depending on a number of clusters subjected to clustering and weighting on each feature amount in a similarity computation.

Figure 8:
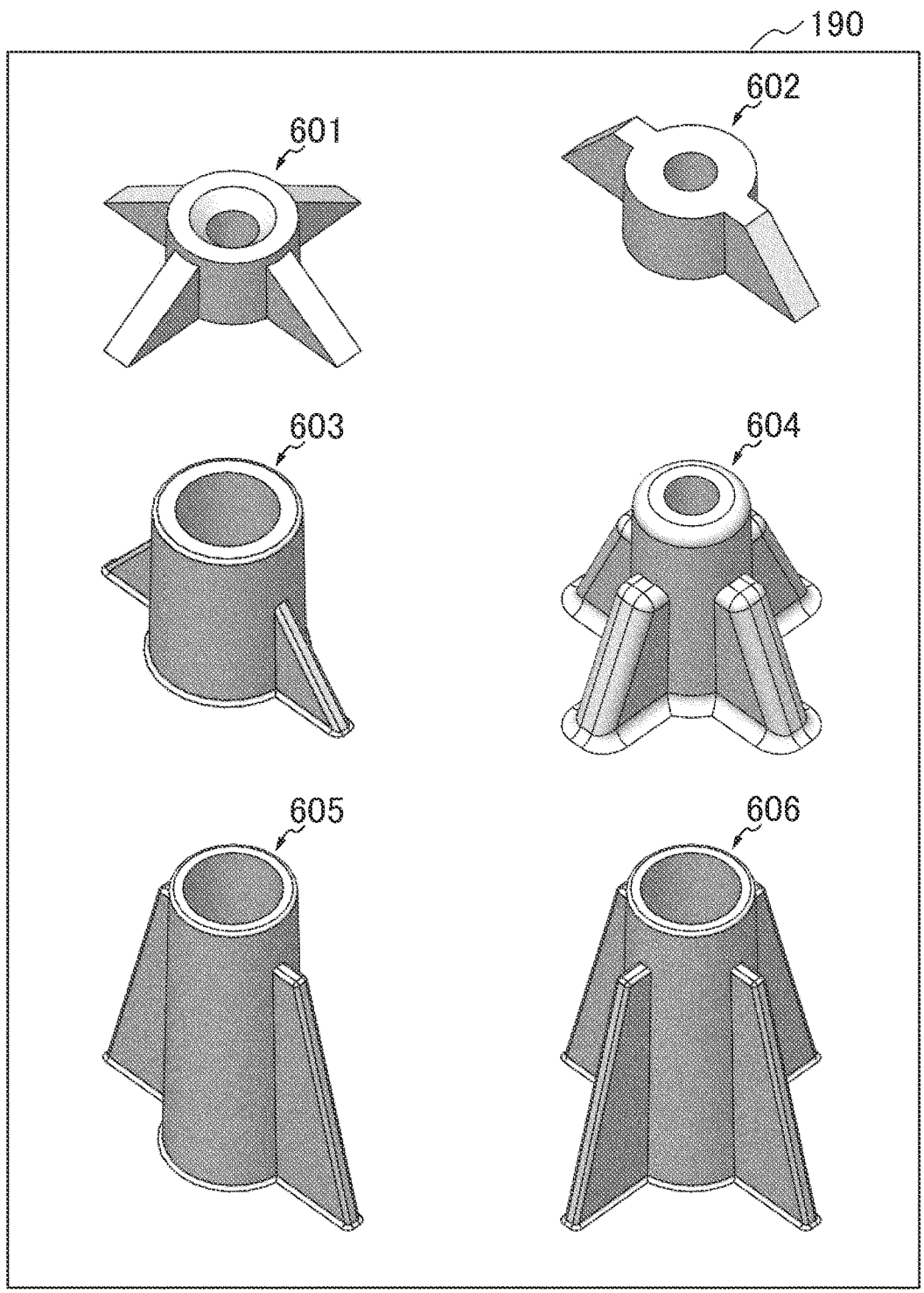
FIG. 8 illustrates an example of a search key shape data (CAD shape to be a cluster center)

Subsequently, the cluster center computation unit 154 computes a feature amount of a cluster center of each cluster with respect to clustering feature amount data 180. In the present example, feature amount data of three-dimensional CAD data closest to a feature amount computed as a center of a cluster is handled as a cluster center. As a result, for example, feature amount data equivalent to CAD shapes 601 to 606 shown in FIG. 8 is computed as a cluster center of each of clusters 501 to 506.

Subsequently, the search key shape registration unit 155 registers feature amount data (in the present example, feature amount data equivalent to CAD shapes 601 to 606) of each cluster center computed by the cluster center computation unit 154 as search key shape data 190.

The visualization unit 156 causes search key shape data 190 and clustering feature amount data 180 to be displayed on the display 139. At this time, it is desirable to display a shape equivalent to feature amount data, rather than feature amount data itself. For example, the CAD shapes shown in FIG. 7 and FIG. 8 are caused to be displayed on the display 139. Or, in cases where feature amount data of three-dimensional CAD data closest to a cluster center is handled as a cluster center, CAD shapes are displayed on a cluster-by-cluster basis as shown in FIG. 7 and a CAD shape to be a cluster center among the CAD shapes can be identifiably displayed.

As mentioned above, a user can generate a search key shape without trial and error only by specifying three-dimensional CAD data to be searched for and thus, identification of a dedicated shape is facilitated and expansion of the coverage of design rule check is facilitated.

Second Embodiment

A partial shape not desired to search for as a similar shape can also be searched for as a similar shape depending on a search key shape generated according to the first embodiment. For this reason, in the second embodiment, cluster adjustment processing is performed to adjust a range of clusters corresponding to a search key shape. In the following two possible cases, cluster adjustment processing is desired.

(A) A case where a specific shape is not desired to search for as a similar shape, and (B) A case where some of similar shapes included in one cluster are desired to separate to a different cluster In either case, a cluster adjustment can be made as identical cluster adjustment processing.

Such cluster adjustment processing is performed by the cluster adjustment unit 157 of the search key shape registration program 150.

(7) Cluster Adjustment Unit 157

Various parameters and clustering techniques for clustering and parameters of computation of similarity between individual pieces of feature amount data are adjusted such that a partial shape (three-dimensional CAD data) not desired to search for as a similar shape is placed into a different cluster from that of a partial shape (three-dimensional CAD data) desired to search for as similar shape.

Typical clustering techniques involve a parameter requiring adjustment. For example, in the K-means method, one of clustering techniques, a number of clusters to be divided and the like must be set. Further, a similarity (distance) between individuals (pieces of feature amount data) is computed for clustering. When a similarity is computed, weighting must be set for each feature amount. These parameters having an influence on clustering are designated as hyperparameters.

The cluster adjustment unit 157 adjusts clusters divided by the clustering unit 153 by adjusting a hyperparameter. A cluster adjustment technique is not specially limited. Such optimization techniques as gradient method and GA (Genetic Algorithm) are known and a cluster adjustment can be made by applying these techniques.

Figure 9:
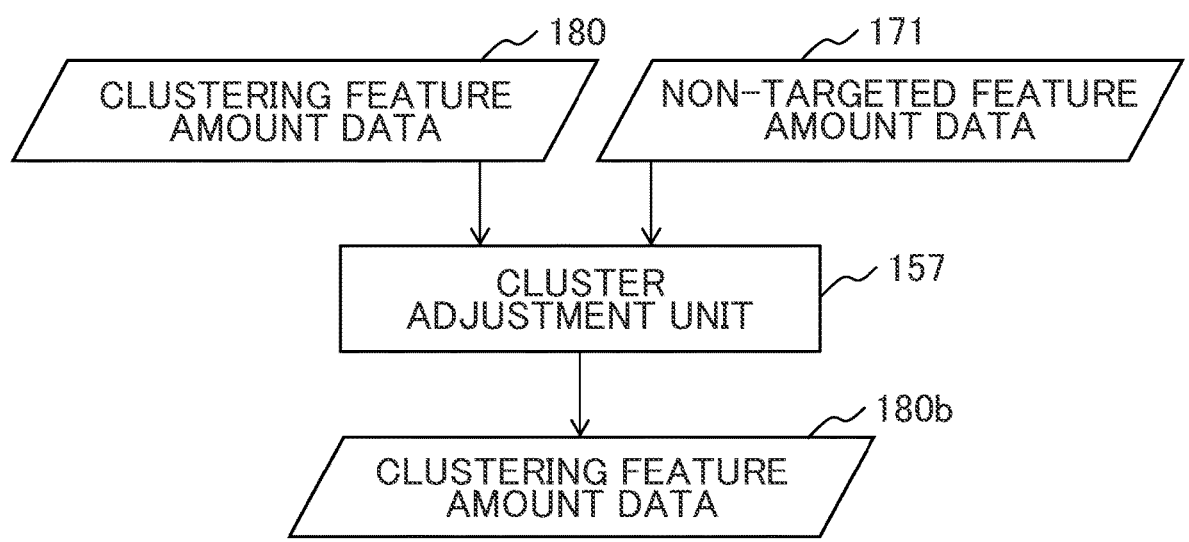
FIG. 9 is a drawing showing input/output information to a cluster adjustment unit.
Figure 10:
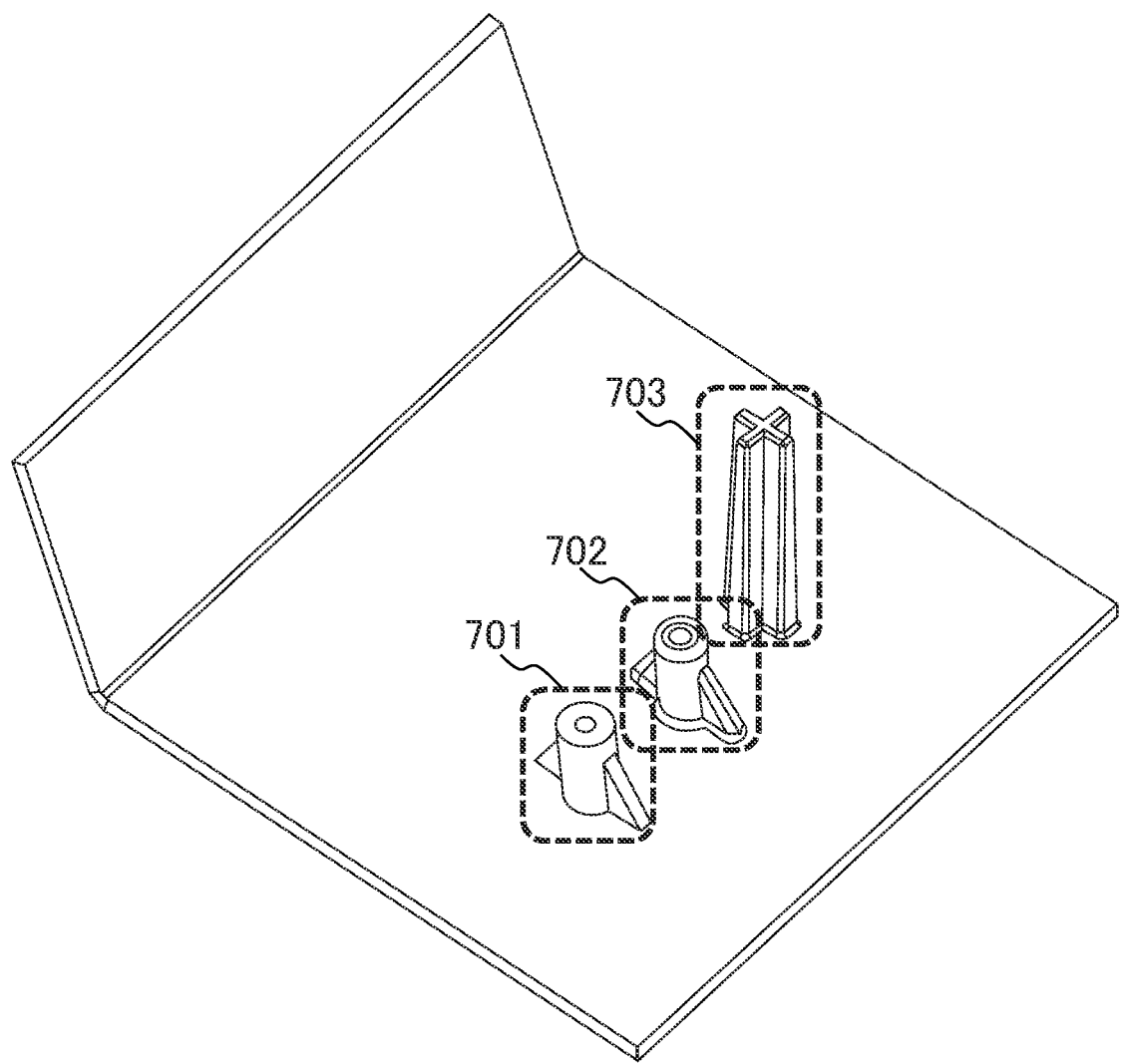
FIG. 10 illustrates an example of three-dimensional CAD data (CAD shape)

FIG. 9 illustrates input/output information to the cluster adjustment unit 157. Clustering feature amount data 180 and feature amount data (non-targeted feature amount data 171) of three-dimensional CAD data not desired to search for as a similar shape are inputted to the cluster adjustment unit 157 and clustering feature amount data 180*b* with cluster classification adjusted is outputted from the unit.

With respect to non-targeted feature amount data 171, the following two registration methods are possible and either method is acceptable. In a first method, a partial shape (three-dimensional CAD data) not desired to search for as a similar shape is registered as non-targeted three-dimensional CAD data 161 (refer to FIG. 3) by the shape group registration unit 151. The registration method is the same as in the case of targeted three-dimensional CAD data 160. Non-targeted feature amount data 171 can be obtained by the feature amount computation unit 152 computing a feature amount with respect to non-targeted three-dimensional CAD data 161. In a second method, non-targeted three-dimensional CAD data 161 is obtained by specifying feature amount data including a cluster desired to adjust from clustering feature amount data 180. For example, one or more CAD shapes desired to classify into the category of non-targeted or separate from a cluster are specified with respect to clustering feature amount data 180 displayed by the visualization unit 156 as shown in FIG. 7. As a result, three-dimensional CAD data corresponding to the specified CAD shapes is altered from targeted three-dimensional CAD data 160 to non-targeted three-dimensional CAD data 161 and a feature amount of the data is taken as non-targeted feature amount data 171.

A description will be given to a processing procedure for search key shape registration in the second embodiment with attention focused on cluster adjustment processing with reference to FIG. 10 to FIG. 13. Generation of a search key shape pertaining to a boss shape will be taken as an example as in relation to the first embodiment.

The following case will be assumed: Search key shape data 190 corresponding to CAD shapes 601 to 606 shown in FIG. 8 obtained by processing in the first embodiment is taken as a search key. Then, a similar shape is searched for with respect to the CAD shapes (three-dimensional CAD data) shown in FIG. 10. As a result, partial shapes 701 to 703 are retrieved but among these partial shapes, shape 703 is not a partial shape the user desires to retrieve. Further, it is assumed that partial shape 703 is determined to resemble a search key shape corresponding to shape 604 shown in FIG. 8. Consequently, a cluster is adjusted to suppress such an excessive search.

In the above-mentioned example, multiple pieces of search key shape data are searched for. A similar partial shape search may be performed using one piece of search key shape data or may be performed using multiple pieces of search key shape data. It is advisable to select search key shape data to be used based on a shape desired to search for and an allowable recognition rate.

Figure 11:
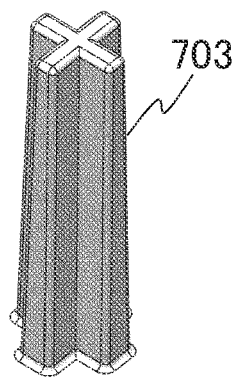
FIG. 11 illustrates an example of non-targeted three-dimensional CAD data (CAD shape)

Consequently, three-dimensional CAD data of CAD shape 703 shown in FIG. 11 is taken as non-targeted three-dimensional CAD data 161 and non-targeted feature amount data 171 that is a feature amount of the data is obtained.

At the clustering unit 153, targeted feature amount data 170 and non-targeted feature amount data 171 are subjected to clustering according to a feature amount and a result of clustering is registered as clustering feature amount data 180. It is assumed that three-dimensional CAD data of the 48 CAD shapes shown in FIG. 5 has been registered as targeted feature amount data 170 as in the first embodiment. When a clustering technique and a hyperparameter for clustering are the same as in the first embodiment, the three-dimensional CAD data is divided into clusters 901 to 906 shown in FIG. 12 and a feature amount of three-dimensional CAD data constituting each cluster is registered as clustering feature amount data 180 of each cluster. At this stage, targeted feature amount data 170 and non-targeted feature amount data 171 coexist in cluster 904.

Consequently, the cluster adjustment unit 157 optimizes various parameters and clustering techniques for clustering and parameters of computation of similarity between individual pieces of feature amount data such that targeted feature amount data 170 and non-targeted feature amount data 171 are placed into different clusters. This can be implemented by solving an optimization problem with various hyperparameters taken as design variables for the purpose of minimizing a number of clusters in which targeted feature amount data 170 and non-targeted feature amount data 171 coexist using such an optimization technique as gradient method or GA.

Figure 13:
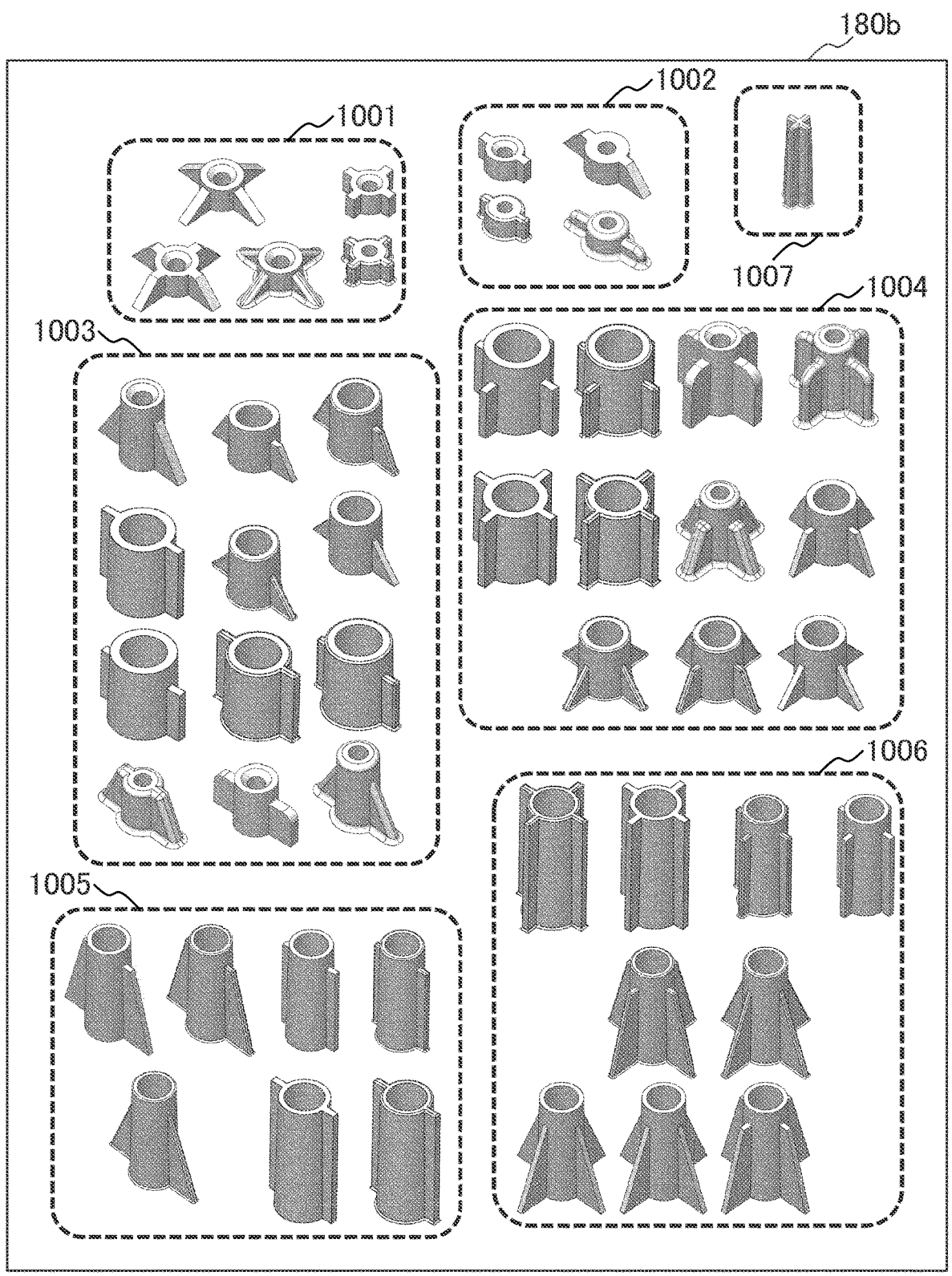
FIG. 13 illustrates an example of clustering feature amount data (CAD shape) after cluster adjustment.

In the case of the present example, a face including a hole portion exists at the center of targeted feature amount data 170 (CAD shapes shown in FIG. 5) and a face including a hole portion does not exist at the center of non-targeted feature amount data 171 (CAD shape 703) and these pieces of data do not topologically resemble each other. For this reason, it is expected that targeted feature amount data 170 and non-targeted feature amount data 171 are placed into different clusters by applying an optimization technique and increasing a weight on topological similarity. As mentioned above, targeted feature amount data 170 and non-targeted feature amount data 171 are placed into different clusters by optimizing a hyperparameter and the like. As a result, as shown in FIG. 13, clusters 1001 to 1006 that are clusters of targeted feature amount data 170 and cluster 1007 that is a cluster of non-targeted feature amount data 171 are obtained.

Figure 12:
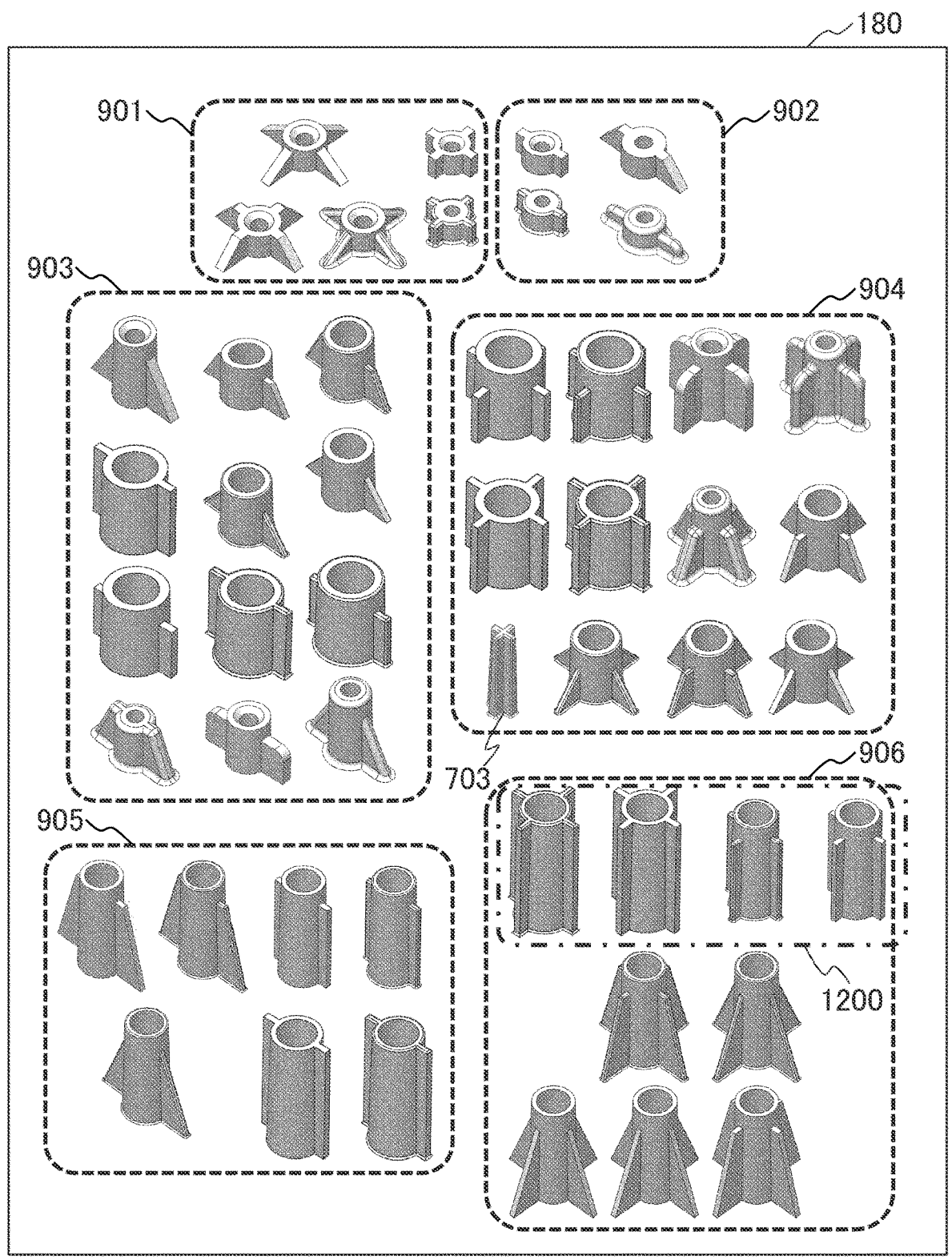
FIG. 12 illustrates an example of clustering feature amount data (CAD shape)

When four CAD shapes included in set 1200 are to be separated from cluster 906 as shown in FIG. 12, optimization processing for hyperparameters and the like only has to be similarly performed with a feature amount of three-dimensional CAD data corresponding to the four CAD shapes included in set 1200 taken as non-targeted feature amount data 171. As a result, a range of similar shapes searched for by the search key shape data 190 can be adjusted.

As mentioned above, a user can adjust a range (size of a cluster) searched for according to search key shape data only by specifying targeted three-dimensional CAD data the user desires to search for and non-targeted three-dimensional CAD data the user does not desire to search for. For this reason, a similar partial shape search based on search key shape data can be easily optimized.

Up to this point, a description has been given to the present invention with reference to the embodiments but the present invention is not limited to the foregoing. For example, in the above example, the designing environment is implemented by different computers, the design device 101 and the design support device 121. Instead, a designing environment may be implemented by an identical computer. The search key shape registration program according to the above embodiments may be implemented on a cloud and has no limitation with respect to how the program is installed.

The present invention is effective not only in shape search for design rule check but also in searching past design data for a similar shape and is utilized in a wide range of scenes. An example will be taken. "Development of Analytical Model Reuse Type Mesh Automatic Generation Technology Using Similar Shape Search" proposes a method in which a high-quality analytical model is efficiently generated by reusing an analytical model corresponding to a similar shape in past design data. The present invention can also be utilized in such a scene.

What is claimed is:

1. A design support device registering a search key shape for performing a similar shape search with respect to a predetermined partial shape, the design support device comprising:
  a processor;
  a memory coupled to the processor, storing instructions that when executed by the processor configures the processor to:
  compute a feature amount, which is geometric data of CAD shapes, for each of a plurality of pieces of three-dimensional CAD shape data and using each of a plurality of pieces of three-dimensional CAD shape data, the plurality of pieces of the CAD shape data each having data designated as a B-REP (Boundary Representation) of geometric data including faces constituting a solid, boundary lines constituting a face, and starting and end points constituting lines, cluster the pieces of three-dimensional CAD data based on the feature amount, determine a feature amount of three-dimensional CAD data having a feature amount closest to a feature amount computed as a center of the cluster among three-dimensional CAD data included in the cluster as the feature amount of the cluster center, search the CAD shape data using a search key shape to obtain a desired CAD shape, the search key shape being feature amount data of the cluster center, the search key shape being defined by the geometric data, adjust clustering of a plurality of pieces of three-dimensional CAD data including targeted three-dimensional CAD data desired to search for as a similar shape to the predetermined partial shape and non-targeted three-dimensional CAD data not desired to search for as a similar shape to the predetermined partial shape, and adjust a hyperparameter used for clustering so as to minimize a number of clusters in which the targeted three-dimensional CAD data and the non-targeted three-dimensional CAD data coexist with each other, thereby a range of similar shapes searched for by the search key shape data can be adjusted.

2. The design support device according to claim 1, wherein the processor is configured to register three-dimensional CAD data in a specified data file or cause a CAD screen to be displayed on a display screen and registers three-dimensional CAD data corresponding to a partial shape specified on the CAD screen.

3. The design support device according to claim 1, wherein the computed feature amount of three-dimensional CAD data includes a geometric feature amount and a topological feature amount.

4. The design support device according to claim 1, wherein the processor is configured to adjust clustering of the pieces of three-dimensional CAD data when with respect to an arbitrary cluster clustered by the clustering unit, one or a plurality of pieces of three-dimensional CAD data included in that cluster are specified as the non-targeted three-dimensional CAD data.

5. The design support device according to claim 1, wherein a number of clusters and weighting of each feature amount for computation of similarity between the pieces of three-dimensional CAD data are included in the hyperparameter.

6. A search key shape registration method, executed by a processor, of registering a search key shape for performing a similar shape search with respect to a predetermined partial shape using a design support device, including a memory and the processor executing a shape group registration unit, a feature amount computation unit, a clustering unit, a cluster center computation unit, and a search key shape registration unit, the search key shape registration method, executed by the processor, comprising the steps of:

the feature amount computation unit computing a feature amount, which is geometric data of the CAD shapes, for each of a plurality of pieces of the three-dimensional CAD data and using each of a plurality of pieces of three-dimensional CAD shape data, the plurality of pieces of the CAD shape data each having data designated as a B-REP (Boundary Representation) of geometric data including faces constituting a solid, boundary lines constituting a face, and starting and end points constituting lines;

the clustering unit clustering the pieces of three-dimensional CAD data based on the feature amount;

the cluster center computation unit determining a feature amount of a cluster center of each cluster from a feature amount of the three-dimensional CAD data; and searching the CAD shape data using a search key shape to obtain a desired CAD shape, the search key shape being feature amount data of the cluster center, the search key shape being defined by the geometric data, wherein the design support device includes a cluster adjustment unit, and wherein the cluster adjustment unit adjusts clustering of a plurality of pieces of three-dimensional CAD data including targeted three-dimensional CAD data desired to search for as a similar shape to the predetermined partial shape and non-targeted three-dimensional CAD data not desired to search for as a similar shape to the predetermined partial shape, and adjusts a hyperparameter used for clustering so as to minimize a number of clusters in which the targeted three-dimensional CAD data and the non-targeted three-dimensional CAD data coexist with each other, thereby a range of similar shapes searched for by the search key shape data can be adjusted.

7. The search key shape registration method according to claim 6, wherein the cluster adjustment unit adjusts clustering of the pieces of three-dimensional CAD data when with respect to an arbitrary cluster clustered by the clustering unit, one or a plurality of pieces of three-dimensional CAD data included in that cluster are specified as the non-targeted three-dimensional CAD data.

8. The search key shape registration method according to claim 6, wherein the cluster adjustment unit adjusts a hyperparameter used for clustering so as to minimize a number of clusters in which the targeted three-dimensional CAD data and the non-targeted three-dimensional CAD data coexist with each other.

9. The search key shape registration method according to claim 8, wherein a number of clusters and weighting of each feature amount for computation of similarity between the pieces of three-dimensional CAD data are included in the hyperparameter.

* * * * *